(12) United States Patent
Steidle et al.

(10) Patent No.: US 11,597,346 B2
(45) Date of Patent: Mar. 7, 2023

(54) SENSOR FOR ACTIVATING A VEHICLE-SENSITIVE LOCKING MECHANISM OF A BELT RETRACTOR

(71) Applicant: ZF Automotive Germany GmbH, Alfdorf (DE)

(72) Inventors: Alexander Steidle, Heubach (DE); Brigitte Senger, Obergröningen (DE); Kai-Ulrich Machens, Stuttgart (DE); Johann Hirsch, Alfdorf (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 374 days.

(21) Appl. No.: 16/763,277

(22) PCT Filed: Nov. 14, 2018

(86) PCT No.: PCT/EP2018/081209
§ 371 (c)(1),
(2) Date: May 12, 2020

(87) PCT Pub. No.: WO2019/096836
PCT Pub. Date: May 23, 2019

(65) Prior Publication Data
US 2020/0307509 A1    Oct. 1, 2020

(30) Foreign Application Priority Data
Nov. 16, 2017    (DE) .......................... 102017126987.8

(51) Int. Cl.
*B60R 22/40* (2006.01)
*B60R 22/34* (2006.01)
*B60R 22/42* (2006.01)

(52) U.S. Cl.
CPC .......... *B60R 22/40* (2013.01); *B60R 22/3416* (2013.01); *B60R 22/42* (2013.01)

(58) Field of Classification Search
CPC ...... B60R 22/40; B60R 22/42; B60R 22/3416
See application file for complete search history.

(56) References Cited

U.S. PATENT DOCUMENTS

| | | | |
|---|---|---|---|
| 3,578,260 A | 5/1971 | Kell | |
| 3,722,824 A * | 3/1973 | Hayashi | B60R 22/40 242/384.6 |
| 4,556,177 A | 12/1985 | Kuwakado et al. | |
| 5,145,123 A | 9/1992 | Kotikovsky | |
| 5,289,986 A | 3/1994 | Hoshihara | |
| 2013/0241187 A1* | 9/2013 | Baumgartner | B60R 22/40 280/806 |

FOREIGN PATENT DOCUMENTS

| | | |
|---|---|---|
| DE | 2158311 A1 | 5/1972 |
| DE | 102010063903 A1 | 6/2012 |
| JP | S50128820 U1 | 10/1975 |
| WO | 2012083933 A1 | 6/2012 |

* cited by examiner

*Primary Examiner* — Sang K Kim
(74) *Attorney, Agent, or Firm* — Tarolli, Sundheim, Covell & Tummino LLP

(57) ABSTRACT

The relates to a sensor for activating a vehicle-sensitive locking mechanism of a belt retractor, comprising an inertia body, a bearing supporting the inertia body, a release element which can be moved out of an idle position by movement of the inertia body so as to activate the vehicle occupant restraint system, wherein the inertia body can be pivoted about a stationary point of rotation.

19 Claims, 11 Drawing Sheets

SENSOR FOR ACTIVATING A VEHICLE-SENSITIVE LOCKING MECHANISM OF A BELT RETRACTOR

CROSS-REFERENCE TO RELATED APPLICATION

This application is a national stage of International Application No. PCT/EP2018/081209 filed Nov. 14, 2018, the disclosure of which is incorporated herein by reference in its entirety, and which claimed priority to German Patent Application No. 102017126987.8, filed Nov. 16, 2017, the disclosure of which is incorporated herein by reference in its entirety.

TECHNICAL FIELD

The present disclosure relates to a sensor for activating a vehicle-sensitive locking mechanism of a belt retractor.

BACKGROUND

Sensors for activating the vehicle-sensitive locking mechanism of a seat belt retractor are known. In the event of positive or negative vehicle acceleration, an inertia body is moving and results in pivoting a sensor lever. Thus, a blocking pawl is lifted, causing a blocking mechanism which can block a belt reel and prevent belt webbing from being extended to be activated in different ways. Moreover, the sensor is also released from a specific inclined position of the vehicle.

The known sensors show relatively high noise emission, however, when the vehicle is moved over a stretch of rough road and is vibrating, which noise emission may be felt disturbing by a vehicle occupant.

SUMMARY

Therefore, it is an object of the present disclosure to provide a sensor for a vehicle-sensitive vehicle occupant restraint system which has reduced noise emission during normal travel.

This object is achieved, according to the present disclosure, by a sensor for activating a vehicle-sensitive locking mechanism of a belt retractor, comprising an inertia body, a bearing which supports the inertia body, a release element adapted to be moved out of an idle position by movement of the inertia body so as to activate the vehicle occupant restraint system by the release element, the inertia body being adapted to be pivoted about exactly one stationary point of rotation.

This helps to achieve the advantage that, apart from the movement required for the function, any noise-generating movement of the inertia body is prevented. In particular, movements which might cause rattling or any other disturbing noise are avoided. Especially preferred, oscillating excitations both in the horizontal and vertical directions are avoided.

The inertia body is made, for example at least partially, from ZAMAK or steel. ZAMAK is an alloy containing zinc, aluminum, magnesium and copper. In this way, the inertia body can have sufficient weight to reliably activate the vehicle occupant restraint system.

The bearing may include a ball to which the inertia body is fastened. All movements of the inertia body are slidingly absorbed by the ball so that no impact noise will occur when the inertia body is deflected or returns to its idle position. In addition, the ball enables mobility of the inertia body in all directions, which helps to meet the legal requirements as regards the sensitivity of the sensor.

For example, the inertia body is fastened to the ball via a pin. Thus, the inertia body is tightly fastened to the ball in one point and the ball is moved with any movement of the inertia body. One advantage resides in the fact that the bearing shell can sufficiently enclose the ball to ensure reliable support of the inertia body while allowing for sufficient mobility of the ball.

According to one embodiment, in a point on the ball surface opposed to the suspension point of the inertia body a disk-shaped element which in its center is tightly connected to the ball is disposed. During each movement of the ball, the disk-shaped element is tilted. Said tilting movement can be used to move the sensor lever. In so doing, the fact that an edge of the disk-shaped element is deflected in the vertical direction during tilting, similarly to a rocker though in each direction, is exploited.

The release element may be a sensor lever preferably including a plate-shaped element which rests on the disk-shaped element in an idle state. Especially, the plate-shaped element completely covers the disk-shaped element in a top view. When the disk-shaped element is tilted by an oscillating movement of the inertia body, the edge of the disk-shaped element lifts on one side and forces the disk-shaped element and thus the sensor lever upward. Accordingly, it does not matter in which direction the inertia body swivels out. The more the inertia body swivels out, the more the plate-shaped element is tilted and the more the sensor lever is deflected.

Preferably, the inertia body is accommodated in a housing, the sensor lever being movably mounted on the housing. Thus, the sensor can be preassembled as a unit. This allows to purchase the sensor as a separate subassembly from a supplier, for example.

According to an alternative embodiment, the release element comprises a ball which is supported to be axially movable in a sleeve. By tilting the disk-shaped element, the ball can be lifted and thus activate a locking mechanism of a belt retractor.

The ball may be made at least partially or completely from plastic, e.g. polypropylene, or from steel.

The inertia body may be suspended in a bearing shell encompassing the ball along its equator. This prevents any movement of the ball apart from a rotational movement, especially vertical and/or horizontal lifting of the ball, even in the case of high accelerations. This helps to prevent noise emissions which might occur in the bearing shell when the ball impacts.

According to one embodiment, the inertia body has a conical portion, with the inertia body being supported at the vertex of the cone. This helps to prevent the oscillating member from impacting on the housing when swinging out, which in turn is positive in terms of avoiding noise.

Especially preferred, the inertia body is composed of two cones being in contact with each other at their respective base areas, wherein either of the cones has a convex surface area. Such geometry of the inertia body may help to obtain an advantageous weight distribution and thus adequate oscillating behavior of the inertia body. In addition, the inertia body is adapted to the geometry of the housing by such shape so that the inertia body does not impact on a housing wall when it swings out. The inertia body preferably has a rotationally symmetric design.

Of preference, a damping element is provided which dampens a movement of the ball. The damping element may be a damping medium, for example, especially a solid lubricant, a fat or the like which is arranged between the bearing shell and the ball. The use of a damping medium offers the advantage that friction can be reduced and simultaneously dampening can be achieved. Alternatively, the damping element may be a rubber ring that rests on the ball and decelerates the movements thereof. The damping element helps to minimize wear of the sensor caused by movement of the ball.

Alternatively, or additionally, a damping element which dampens abutment of the inertia body against the housing can be arranged on the inertia body. For example, the damping element is a ring made from elastic material arranged on the inertia body.

Further alternatively, or additionally, a mass ratio of the mass of the release element to the mass of the inertia body can be selected so that deflection of the inertia body is dampened or blocked solely by the mass of the release element in the case of low accelerations for which release of a blocking mechanism is undesired. Such mass ratio $m_{release\ element}/m_{inertia\ body}$ ranges from 0.1 to 1, preferably from 0.1 to 0.5, for example.

According to a preferred embodiment, the sensor lever is formed to make a blocking pawl engage with locking teeth of a blocking mechanism. In this way, the vehicle occupant restraint system can be activated such that a belt reel is blocked when a tensile force acts on a webbing of the belt reel.

BRIEF DESCRIPTION OF THE DRAWINGS

Further features and advantages of the present disclosure will be evident from the following description and from the following drawings which are referred to, and wherein.

DETAILED DESCRIPTION

Figure 1:
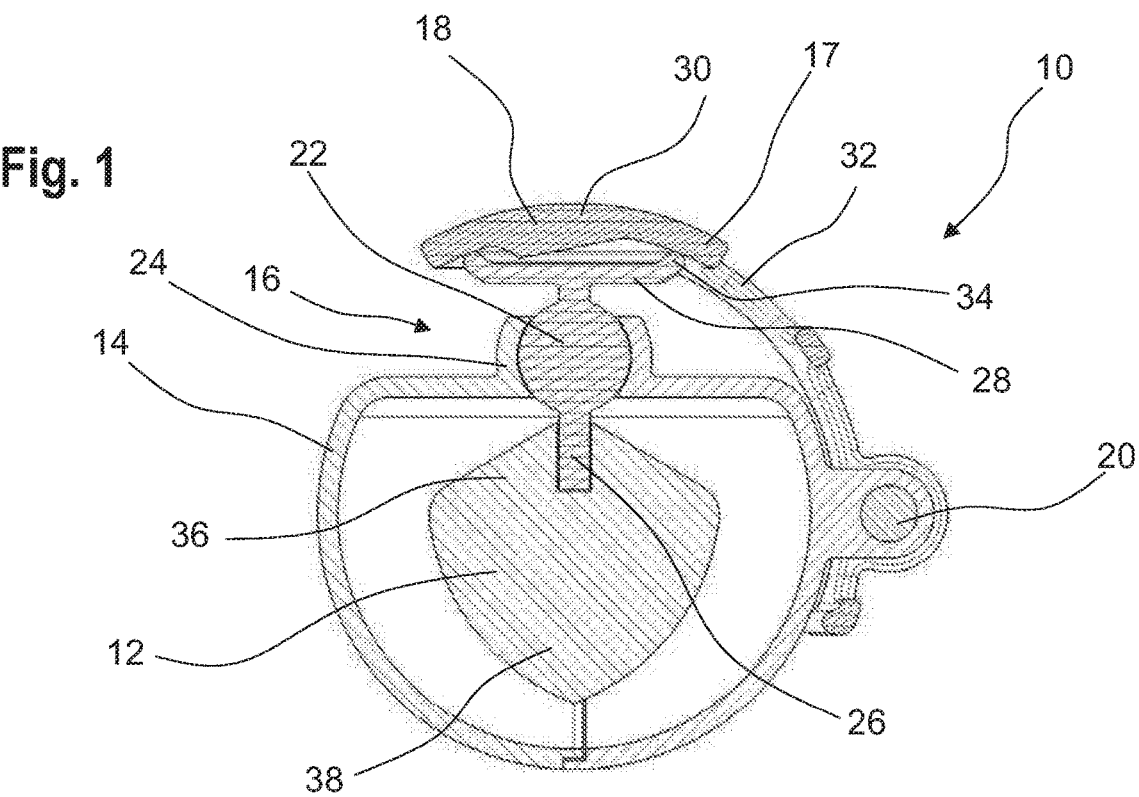
FIG. 1 shows a sensor according to the present disclosure in a first state.

FIG. 1 illustrates a sensor 10 according to the present disclosure for activating a vehicle-sensitive locking mechanism of a belt retractor. The sensor 10 is a pendulum sensor. The sensor 10 comprises an inertia body 12 which is suspended in a housing 14, a bearing 16 and a release element 17, especially a deflectable sensor lever 18 which is pivoted on the housing 14 via a joint 20. The bearing 16 includes a ball 22 supported in a bearing shell 24, the bearing shell 24 encompassing the ball along its equator. For example, the bearing shell 24 encloses an angle of up to +1-40° with the horizontal at the ball 22. Thus, the ball 22 can be safely held while simultaneously sufficient rotation of the ball 22 is possible. Especially, the ball 22 can rotate in all directions. Alternatively, the ball 22 may as well be supported at the peripheral edge of a bore below its equator.

A damping medium such as a solid lubricant, a fat or the like can be provided at the contact surface between the ball 22 and the bearing shell 24. The damping medium may be configured to suppress or dampen oscillation of the inertia body 12 in the case of low accelerations so as to avoid wear of the sensor 10 and to prevent the locking mechanism of a belt retractor from being released at low accelerations. The dynamic behavior of the sensor at higher accelerations at which it is desired to release the locking mechanism and to block the belt reel is not negatively affected by the damping medium, however.

The housing 14 can be manufactured of two shells, for example, which are stuck together, welded or fastened to each other in any similar way. Prior to finally joining the shells, preferably the ball 22 is inserted into the bearing shell 24 so that the ball 22 is reliably held in the housing 14. A pin 26 via which the inertia body 12 is fastened on the ball 22 is formed integrally on the ball 22. Thus, the inertia body 12 can be rotated about a stationary point corresponding to the center of the ball 22 and can oscillate in all directions.

The geometry of the inertia body 12 corresponds to that of two composed cones 36, 38 which contact each other at their respective base areas, either of the cones 38 having a convex surface area. In this way, the inertia body 12 is adapted especially well to the geometry of the housing 14, which is especially clear from FIGS. 2, 3 and 5. This geometry prevents the inertia body 12 from abutting against the housing 14 so that noise emission can be reduced. In order to enable the inertia body to swivel out as far as possible, the inertia body 12 is supported on the vertex of the cone 36. On a side of the ball 22 opposed to the pin 26, a disk-shaped element 28 is arranged which in its center is tightly connected to the ball 22 and which serves as a deflecting element to lift the sensor lever 18. For this purpose, the sensor lever 18 includes a plate-shaped element 30 resting on the disk-shaped element 28. The plate-shaped element 30 is fastened to a lever arm 32 of the sensor lever 18.

The inner contour of the plate-shaped element 30, especially the surface directed toward the disk-shaped element 28, is configured so that the deflection of the sensor lever 18 is independent of the direction in which the inertia body 12 swivels out. Especially a lever ratio which is resulting, when the inertia body 12 swivels in different directions, from the different distance of the bearing point between the disk-shaped element 28 and the plate-shaped element 30 from a pivot point of the sensor lever 18 is balanced by the inner contour of the plate-shaped element 30. At a peripheral edge the disk-shaped element 28 may include a collar 34. The disk-shaped element 28 is preferably formed, just as the pin 26, integrally with the ball 22. Therefore, the sensor 10 includes a minimum of single parts and the assembly is especially simple.

Figure 2:
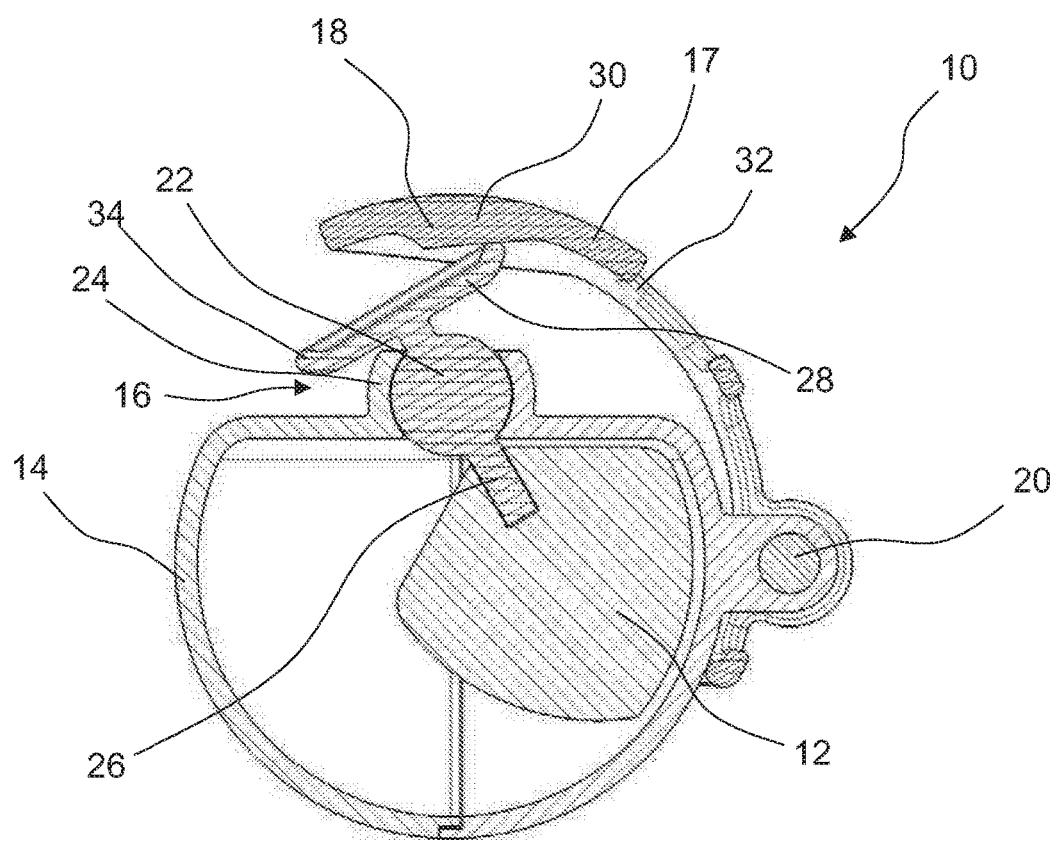
FIG. 2 shows a sensor according to the present disclosure in a second state.

Hereinafter, the mode of operation of the sensor 10 will be illustrated in detail by way of the FIGS. 1 to 5. FIG. 1 shows the sensor 10 in an idle state in which the inertia body 12 is not deflected. FIG. 2 illustrates the sensor 10 in a state in which the inertia body 12 is deflected, for example when a vehicle in which the sensor 10 is installed is accelerated. Depending on the amount of the acceleration forces acting on the inertia body 12, the inertia body will swivel out more or less. In FIG. 2, the inertia body 12 is shown in a maximally deflected position. A locking mechanism of a belt retractor preferably will not be activated before a maximum deflection of the inertia body 12 is reached. In the case of lower accelerations, usually activation of the locking mechanism is not desired.

The ball 22 is rotated by the inertia body 12 swiveling out. It is a particular advantage of the sensor 10 that, upon rotation of the ball 22, almost no noise will occur irrespective of whether the inertia body 12 is deflected or whether it returns to its idle position. When a maximum deflection of the inertia body 12 is reached, the pin 26 abuts on an edge of the bearing shell 24 so that further oscillation of the inertia body 12 is no longer possible. In this manner, the inertia body 12 is prevented from abutting on the housing 14, which in turn contributes to reducing the noise emission. Alternatively, or additionally, an inner face of the housing 14 may be provided with a coating, for example a rubber coating, which dampens noise when the inertia body 12 abuts on a housing wall. During rotation of the ball 22, also the disk-shaped element 28 which is tightly connected to the ball 22 is moved, especially tilted. The tilting of the disk-shaped element 28 causes a peripheral edge of the disk-shaped element 28 to lift, thus causing the plate-shaped element 30 of the sensor lever 18 resting on the disk-shaped element 28 to be lifted. This movement of the sensor lever 18 can be used to activate a locking mechanism of a belt retractor.

Figure 3:
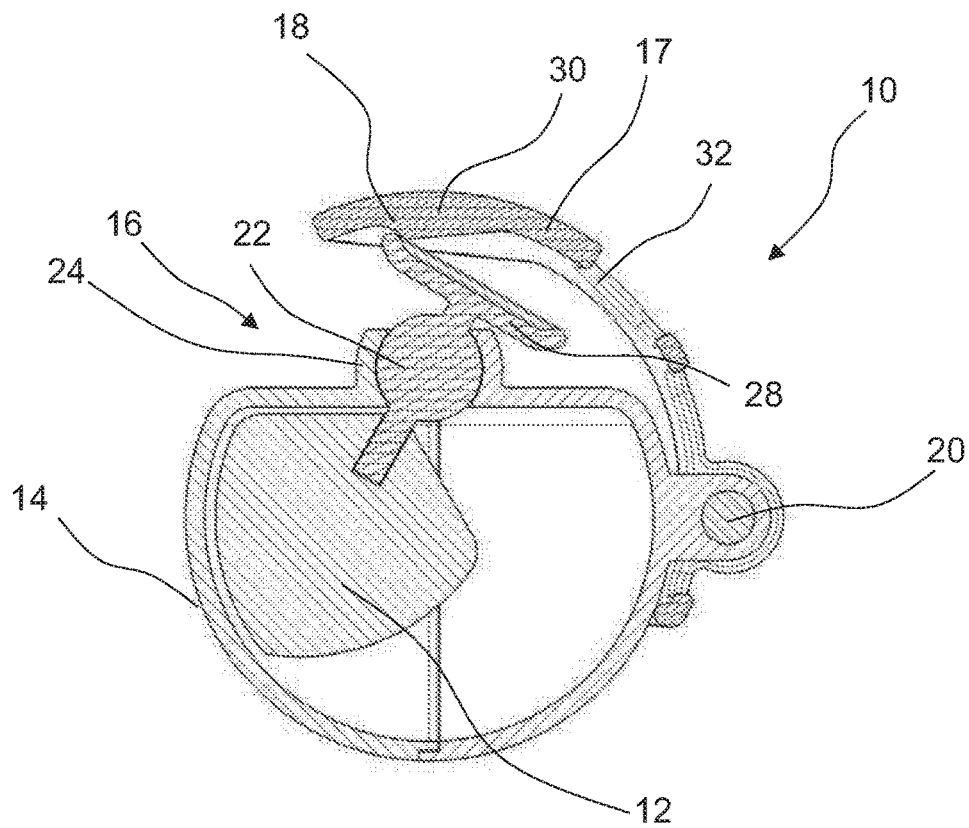
FIG. 3 shows a sensor according to the present disclosure in a third state.
Figure 4:
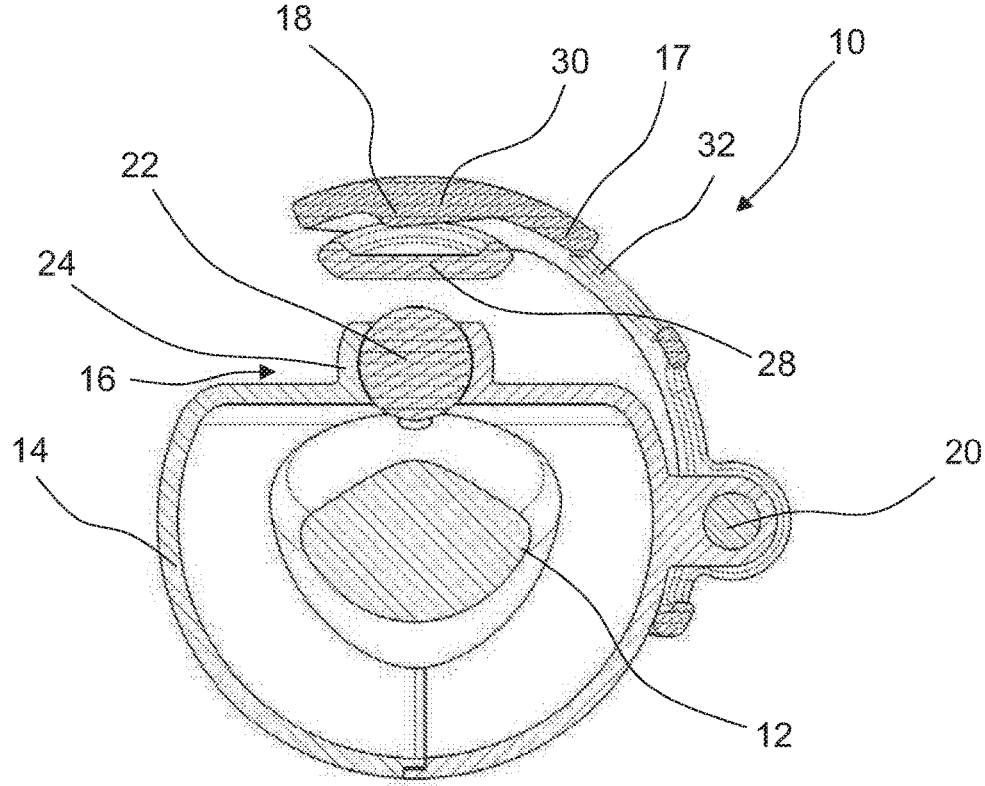
FIG. 4 shows a sensor according to the present disclosure in a fourth state.
Figure 5:
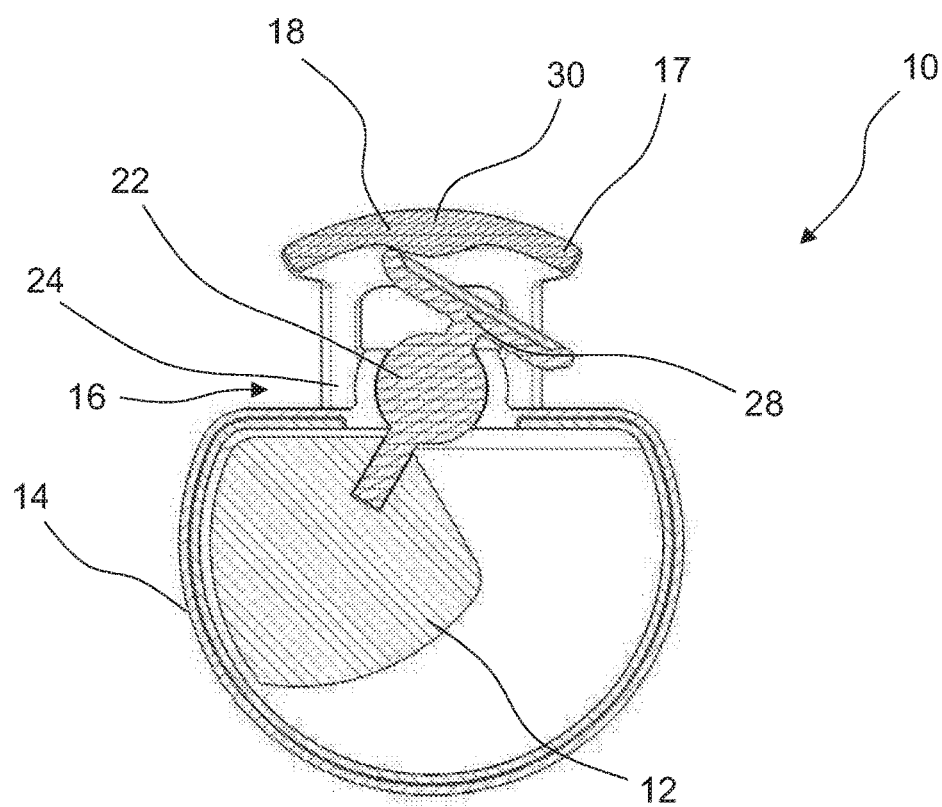
FIG. 5 shows a sensor according to the present disclosure in a fifth state.

FIGS. 3 to 5 equally illustrate the sensor 10, wherein the inertia body 12 is deflected in respective different directions, as it is the case in decelerating or tilting a vehicle, for example.

Figure 6:
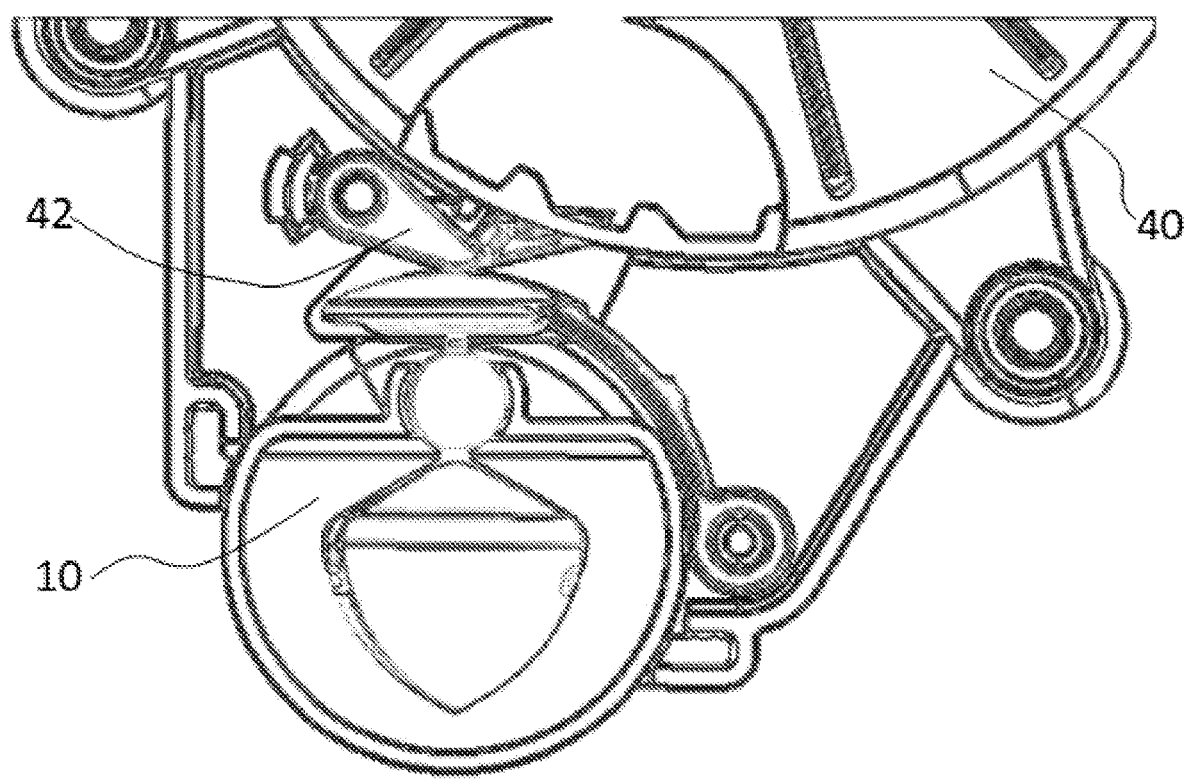
FIG. 6 shows the sensor in a state mounted on a housing of a belt reel.

FIG. 6 shows the sensor 10 in a mounted state on a housing 40 of a belt reel. A blocking pawl 42 is disposed in contact with the sensor lever 18, especially with the plate-shaped element 30. When the sensor lever 18 is sufficiently lifted due to acceleration of the vehicle, the blocking pawl 42 is made to engage in locking teeth of a blocking mechanism not shown.

Figure 7:
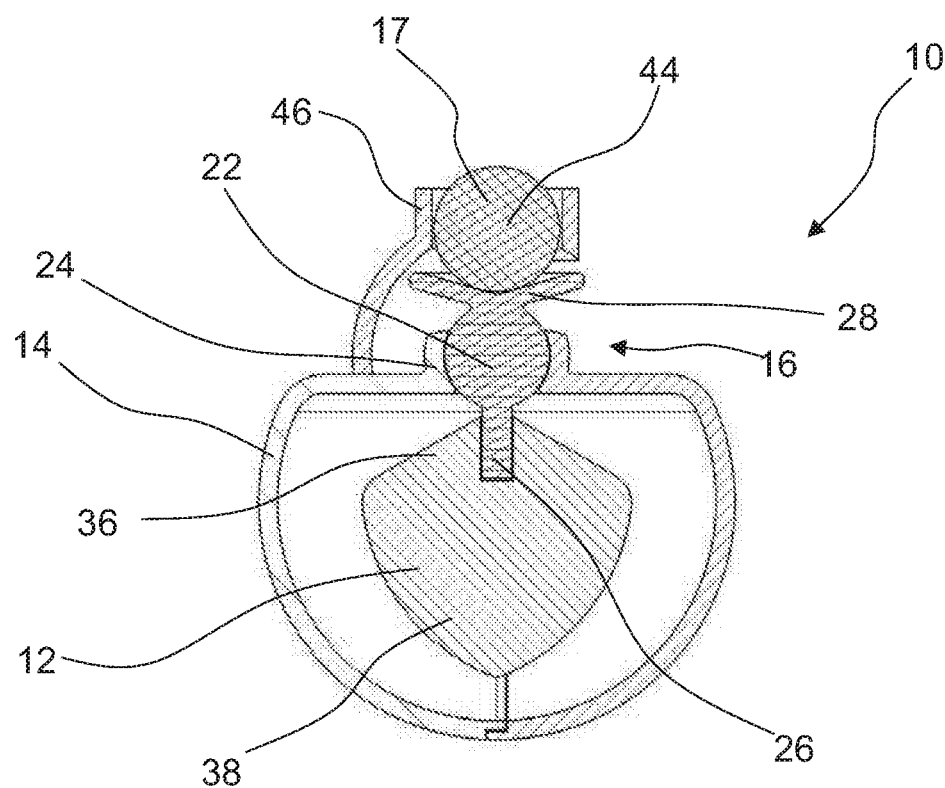
FIG. 7 shows a second embodiment of a sensor according to the present disclosure.
Figure 8:
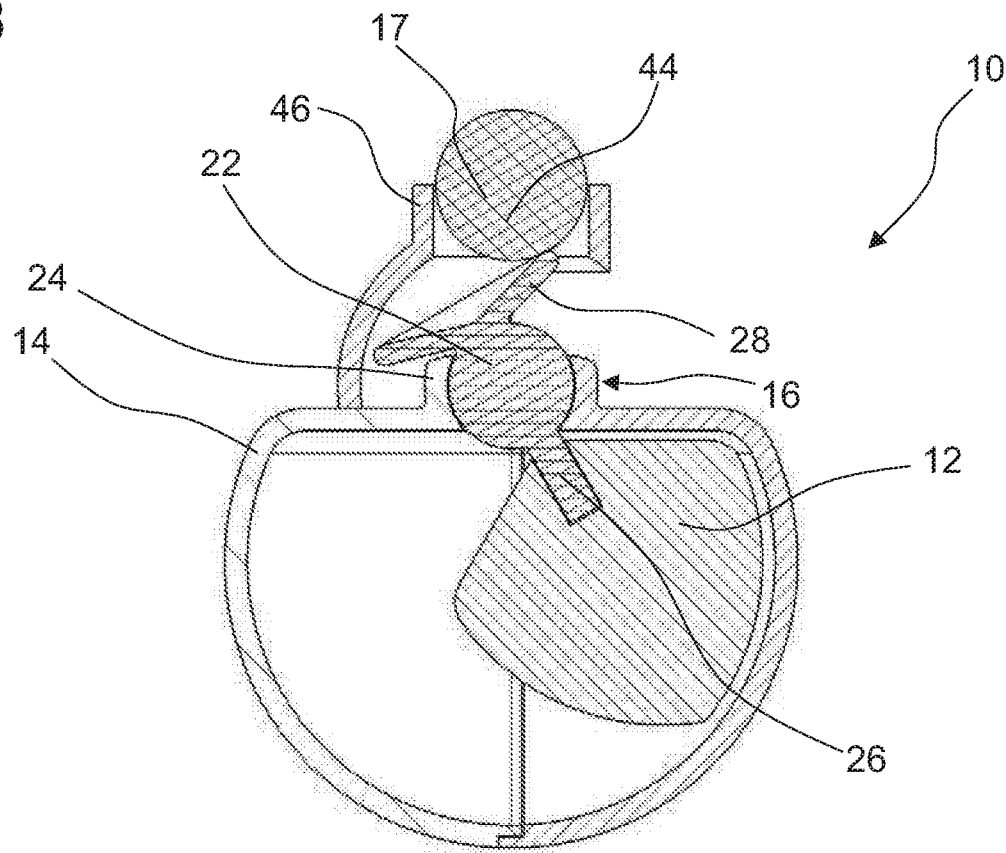
FIG. 8 shows the second embodiment of a sensor according to the present disclosure.

FIGS. 7 and 8 illustrate another embodiment of a sensor 10, the sensor 10 in FIG. 7 being shown in an idle state and in FIG. 8 being shown during acceleration. For like structures having like functions which are known from the foregoing embodiment, hereinafter like reference numerals are used and insofar the preceding explanations are referred to, wherein in the following the differences of the respective embodiments will be discussed to avoid repetitions. In this embodiment, the release element 17 is in the form of an additional ball 44 which is formed to be axially slidable in a sleeve 46. The ball 44 rests on the disk-shaped element 28 such that, upon rotation of the ball 22 and tilting of the disk-shaped element 28, the ball 44 is lifted. For this purpose, the disk-shaped element has a conical recess including an opening angle from 80° to 150°. By lifting the ball 44 just as by the sensor lever 18 a locking mechanism of a belt retractor can be activated. This embodiment offers the advantage that the system has a symmetric structure and thus there is no need to compensate for a lever ratio.

In the sleeve 46, especially between the sleeve 46 and the ball 44, equally a damping medium, especially a solid lubricant, a fat or the like, can be provided to dampen the movements of the ball 44 and thus to avoid noise emission during normal travel.

The ball 44 has a low weight as compared to the inertia body 12. This helps to easily deflect the ball 44 when the inertia body 12 is swiveled. In particular, the relatively low weight of the ball 44 helps to prevent a deflection of the inertia body 12 from being weakened by the weight of the ball 44 so that the locking mechanism of the belt retractor can be reliably released. This is achieved, for example, by a ratio of the mass of the ball 44 to the mass of the inertia body 12 ranging from 0.0015 to 0.022.

In order to reach the low weight of the ball 44, said ball is preferably made from a plastic such as polypropylene or from any other suitable plastic. The diameter of the ball 44 ranges from 3 mm to 10 mm, for example, especially the diameter is 6 mm. The weight of the ball 44 ranges, for example, from 0.05 g to 0.15 g and is especially 0.1 g. When using polypropylene as material and a diameter of the ball 44 of 6 mm, the weight of the ball 44 is about 0.1 g.

The inertia body 12 is made from ZAMAK, for example, or any other suitable material such as steel. The weight of the inertia body 12 in this embodiment ranges, for example, from 4 g to 6 g, and especially is 4.6 g. With a ball diameter of 6 mm and an inertia body 12 made from ZAMAK, the mass ratio ranges, for example, from 0.015 to 0.2, and especially is 0.018.

Figure 9:
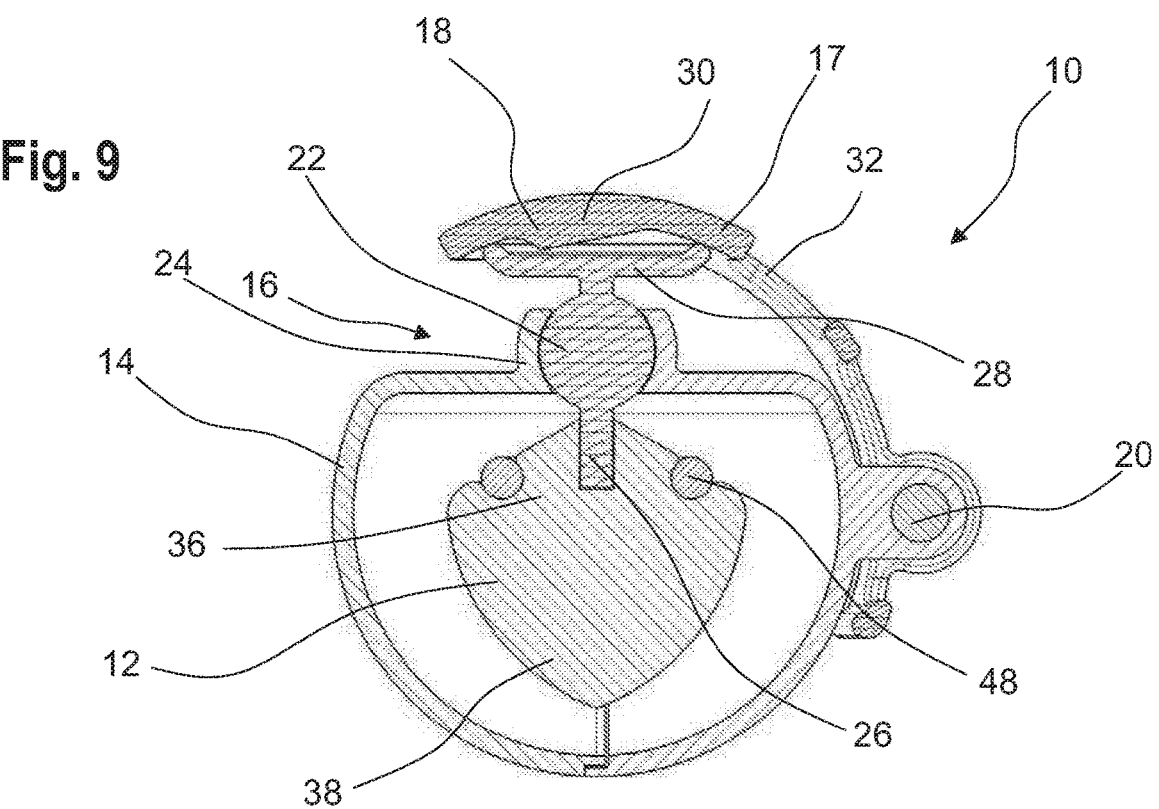
FIG. 9 shows a third embodiment of a sensor according to the present disclosure.
Figure 10:
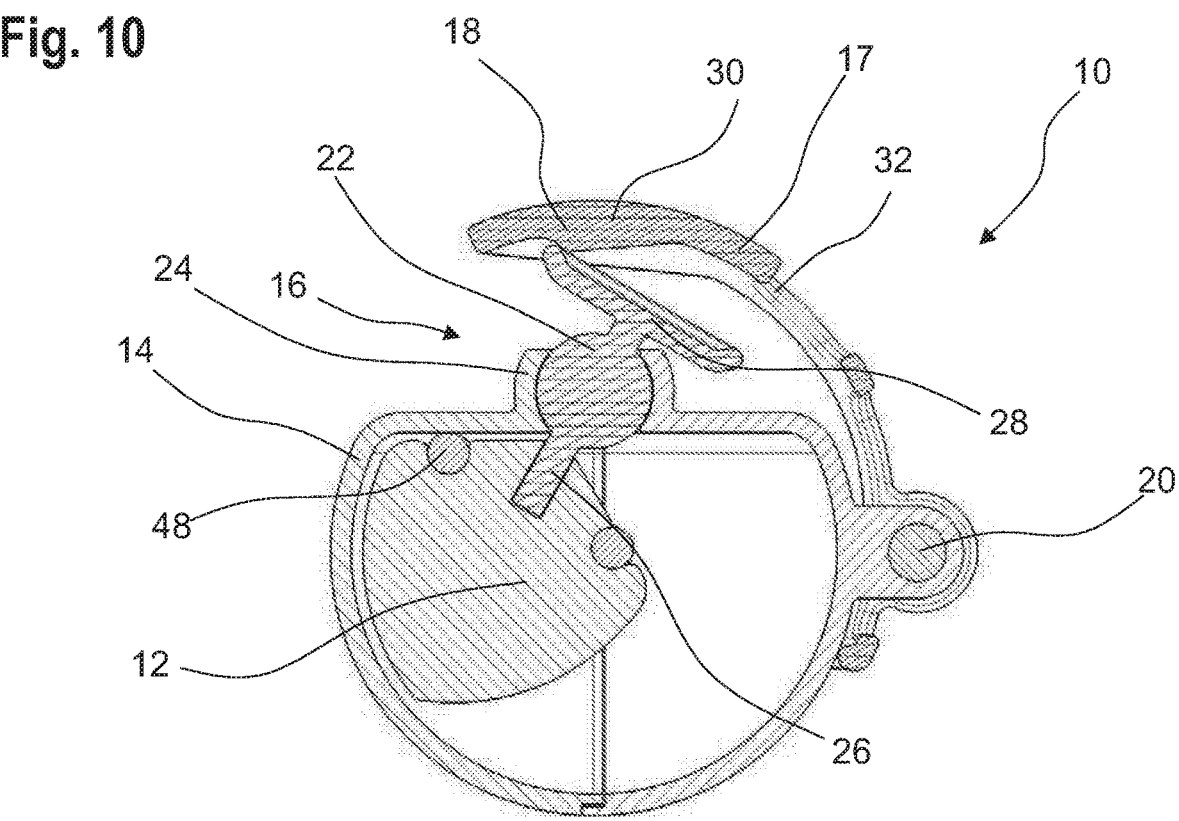
FIG. 10 shows the third embodiment of a sensor according to the present disclosure.

The FIGS. 9 and 10 illustrate another embodiment of the sensor 10.

This embodiment differs from the embodiment shown in FIGS. 1 to 5 by an additional damping ring 48 disposed on the inertia body 12. The damping ring 48 is made from elastic material, for example, and dampens an abutment of the inertia body 12 against the housing 14, whereby both an abutting noise is dampened and wear of the sensor 10 is reduced. Such damping ring 48 can equally be disposed on the surface area of the inertia body 12 and can be in contact with the surface area of the housing 14.

Figure 11:
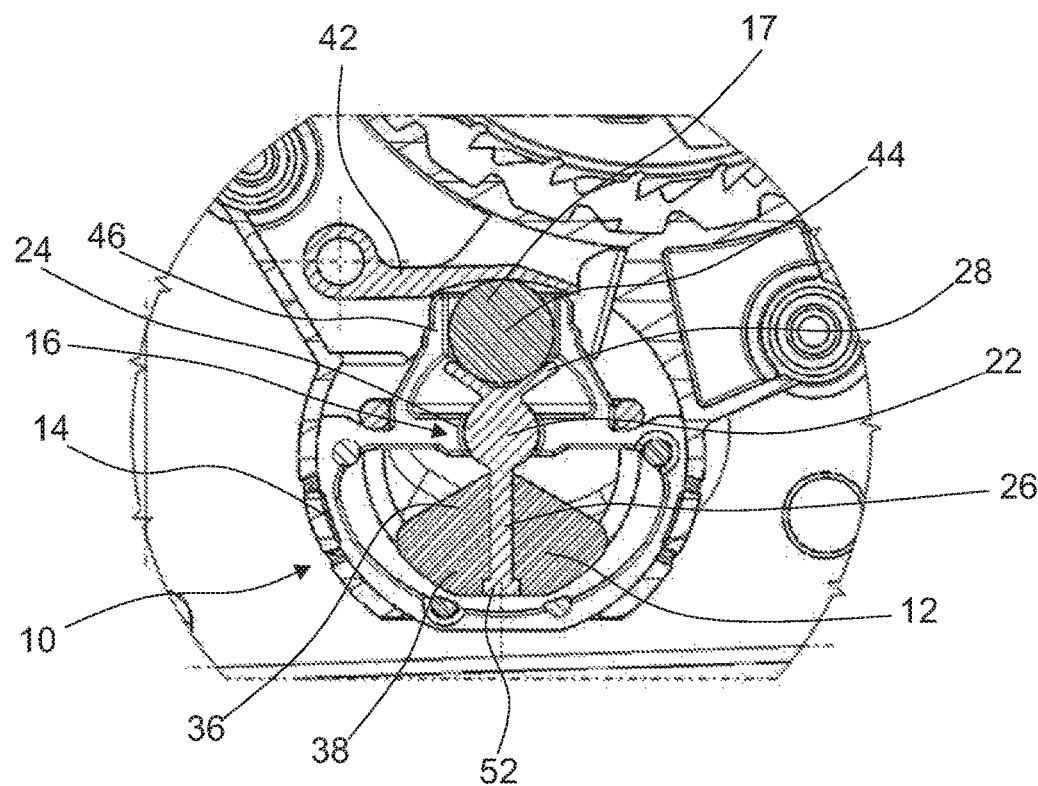
FIG. 11 shows a fourth embodiment of the sensor according to the present disclosure in a first state.
Figure 12:
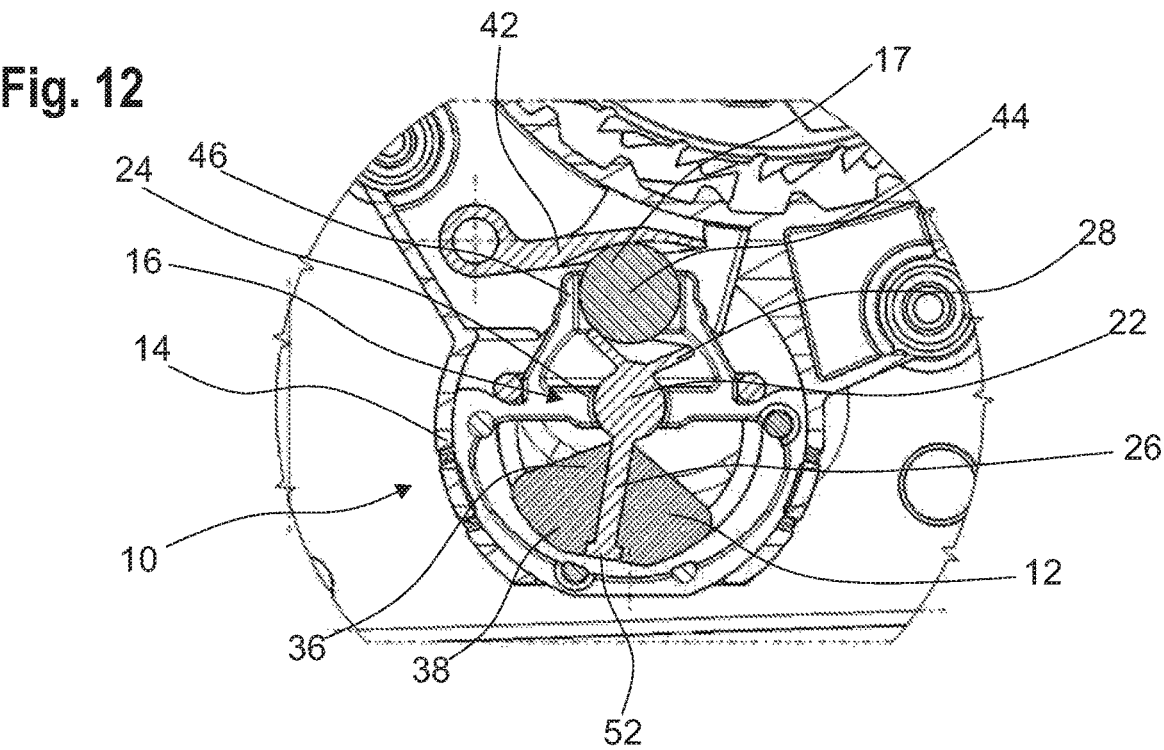
FIG. 12 shows the fourth embodiment of the sensor according to the present disclosure in a second state.

In the FIGS. 11 to 14, another embodiment of a sensor 10 according to the present disclosure is illustrated, wherein the FIGS. 11 and 12 show the sensor 10 in a mounted state on a housing 40 of a belt reel.

FIG. 11 illustrates the sensor 10 in an idle state, while the sensor 10 in FIG. 12 is shown in a deflected state. The mode of operation of the sensor 10 corresponds to the mode of operation described in connection with FIGS. 7 and 8, wherein the blocking pawl 42 is made to engage in locking teeth of the belt reel by lifting the ball 44, when the inertia body 12 is deflected. In the embodiment, the mass ratio of the mass of the ball 44 to the mass of the inertia body 12 differs from the sensor 10 described before in connection with FIGS. 7 and 8. In particular the ratio of the ball mass to the mass of the inertia body 12 is higher than in the afore-described embodiment. For example, the ratio of the ball mass to the mass of the inertia body 12 ranges from 0.1 to 1, especially from 0.1 to 0.5.

Due to such mass ratio the lifting of the ball 44 is impeded by the inertia body 12. This offers the advantage that, in the case of low accelerations, the ball 44 blocks deflection of the inertia body 12. This means that the ball 44 is not lifted in the case of low accelerations. Only in the case of higher acceleration in which release of the locking mechanism is desired, can the inertia body 12 be swiveled to a sufficient extent and can the ball 44 be sufficiently lifted to release the locking mechanism. This offers the advantage that, in this event, no damping medium such as a solid lubricant is required to prevent the inertia body 12 from overshooting.

The required mass ratio is achieved, on the one hand, by the shape and the size of the inertia body 12 and the ball 44 and, on the other hand, by the material selection. The ball 44 can be made from steel or any other material which is heavier than plastic, rather than from plastic. Alternatively, or additionally, the diameter may be increased as compared to the afore-described embodiment.

For example, in the example embodiment described in connection with FIGS. 11 to 14, the ball 44 has a diameter of at least 6 mm, preferably of 7 mm. For example, the ball 44 has a weight of 1 g to 2 g, especially a weight of 1.4 g. In this embodiment, too, the inertia body 12 preferably consists of ZAMAK or steel. Another difference consists in the fact that the pin 26 extends completely across the inertia body 12 and, moreover, at an end directed away from the ball 22 has a widened section 52 which prevents the inertia body 12 from slipping off the pin 26.

Figure 13:
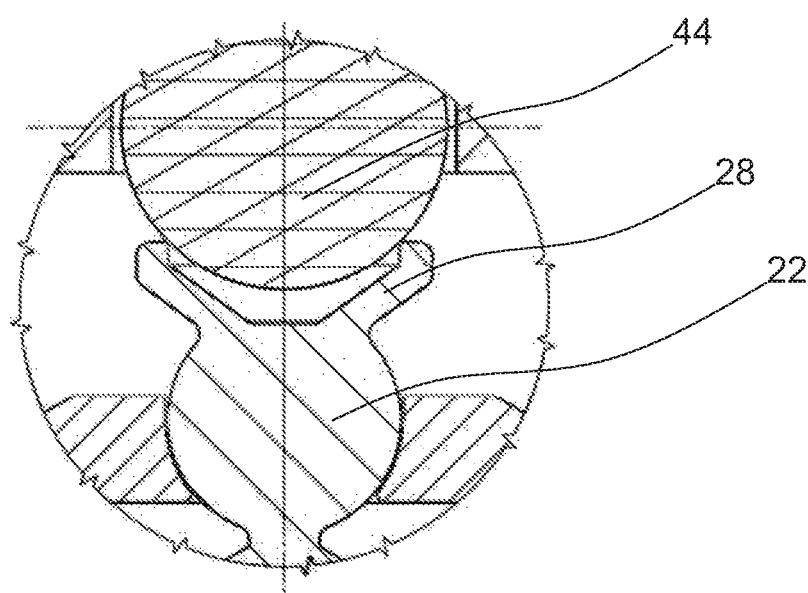
FIG. 13 shows the fourth embodiment of the sensor according to the present disclosure in a third state.

FIG. 13 illustrates another embodiment of the sensor from FIG. 11 and FIG. 12 which differs by the bearing surface of the ball. This bearing surface is no longer conical in the contact area with the ball, but is in the form of a sharp-edged, e.g. rectangular, rim of a peripheral land. This bearing offers the advantage, over a conical bearing surface, of an even more sensitive response threshold of the sensor.

Figure 14:
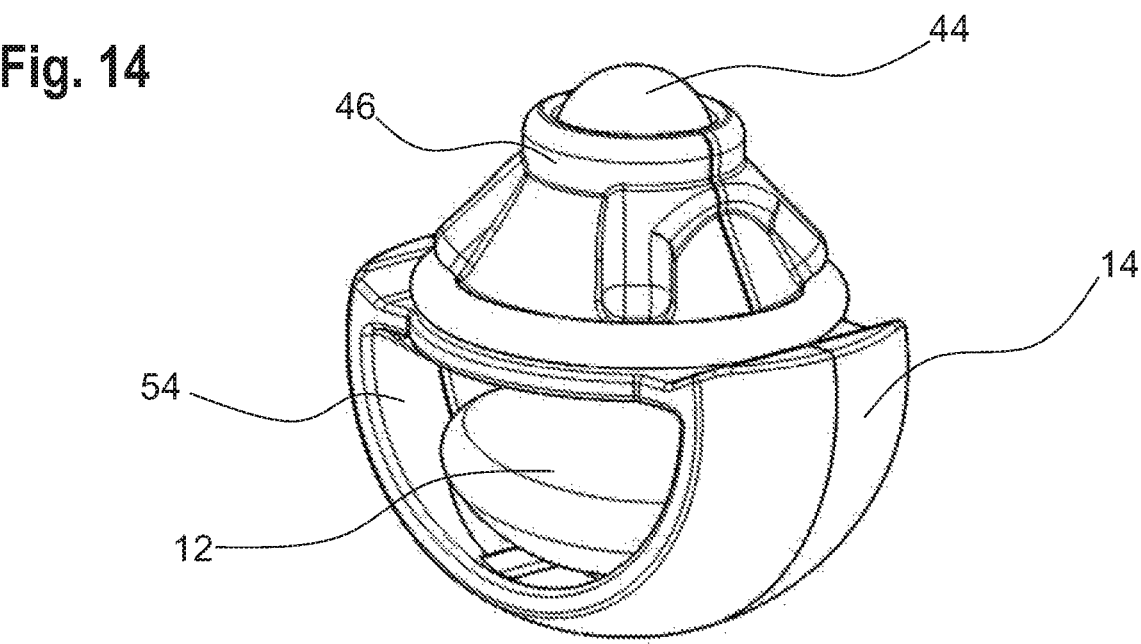
FIG. 14 shows the fourth embodiment of the sensor according to the present disclosure in a fourth state.

FIG. 14 illustrates the sensor 10 from FIGS. 11 and 12 in an isometric view. It is evident that the housing 14 does not completely surround the inertia body 12 but that two openings 54 are provided. In this way, material can be saved. The openings 54 are possible as no damping medium is required in said embodiment.

Figure 15A:
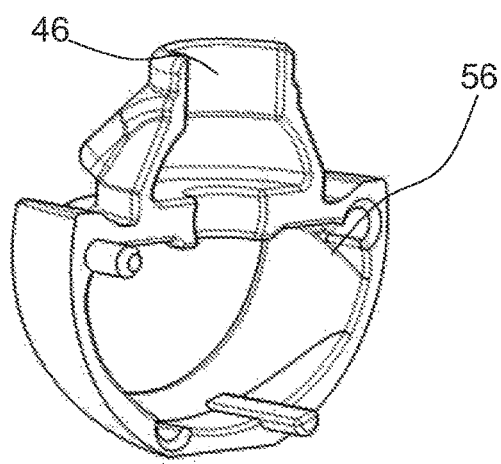
FIG. 15a shows the housing of the sensor from FIG. 14, FIG. 15b also shows the housing of the sensor from FIG. 14.
Figure 15B:
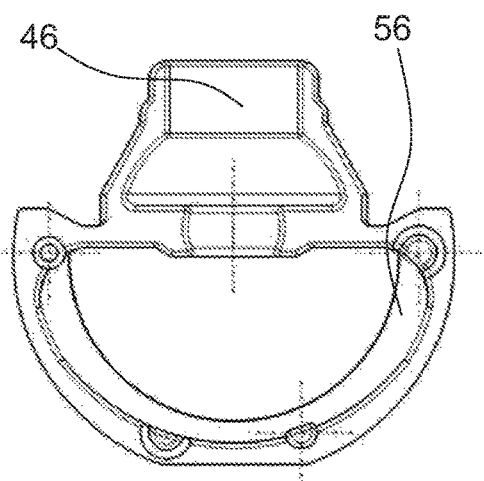

The FIGS. 15*a* and 15*b* illustrate a shell 56 for which two mirror-symmetric halves can be assembled to jointly form the housing 14 shown in FIG. 14. The sleeve 46 in this embodiment is formed integrally with the housing 14. This helps to facilitate the assembly of the sensor 10.

Figure 16:
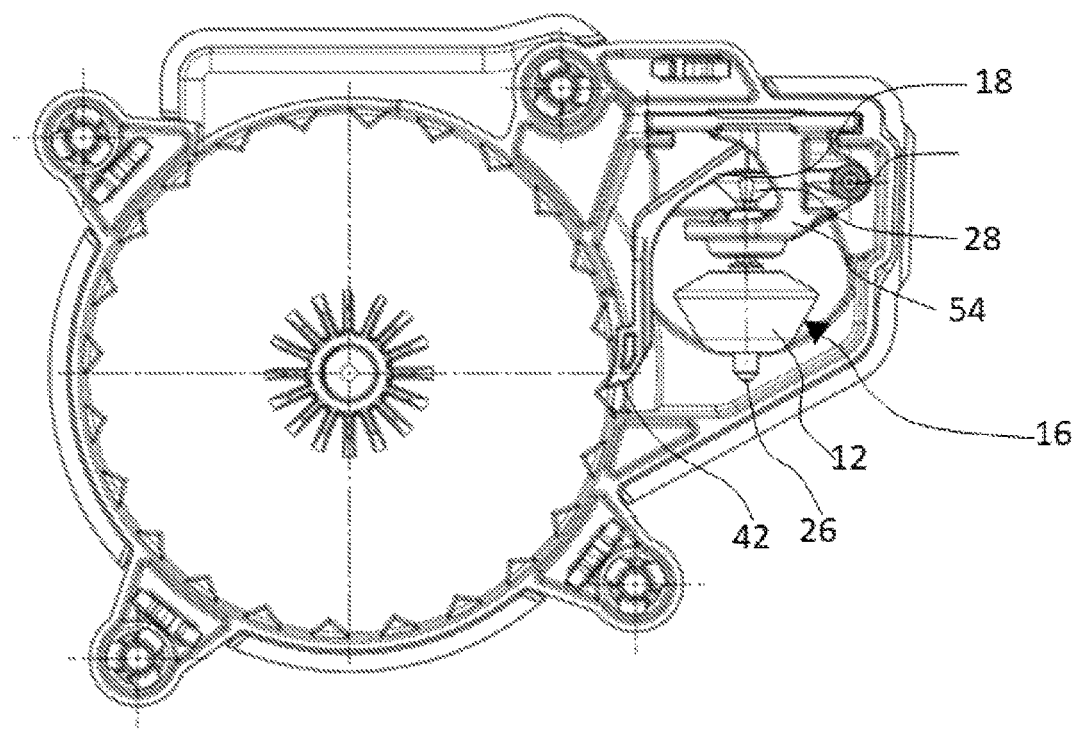
FIG. 16 shows another sensor according to the present disclosure in a mounted state on a housing of a belt reel, FIG. 17 also shows a second view of the sensor in FIG. 16.
Figure 17:
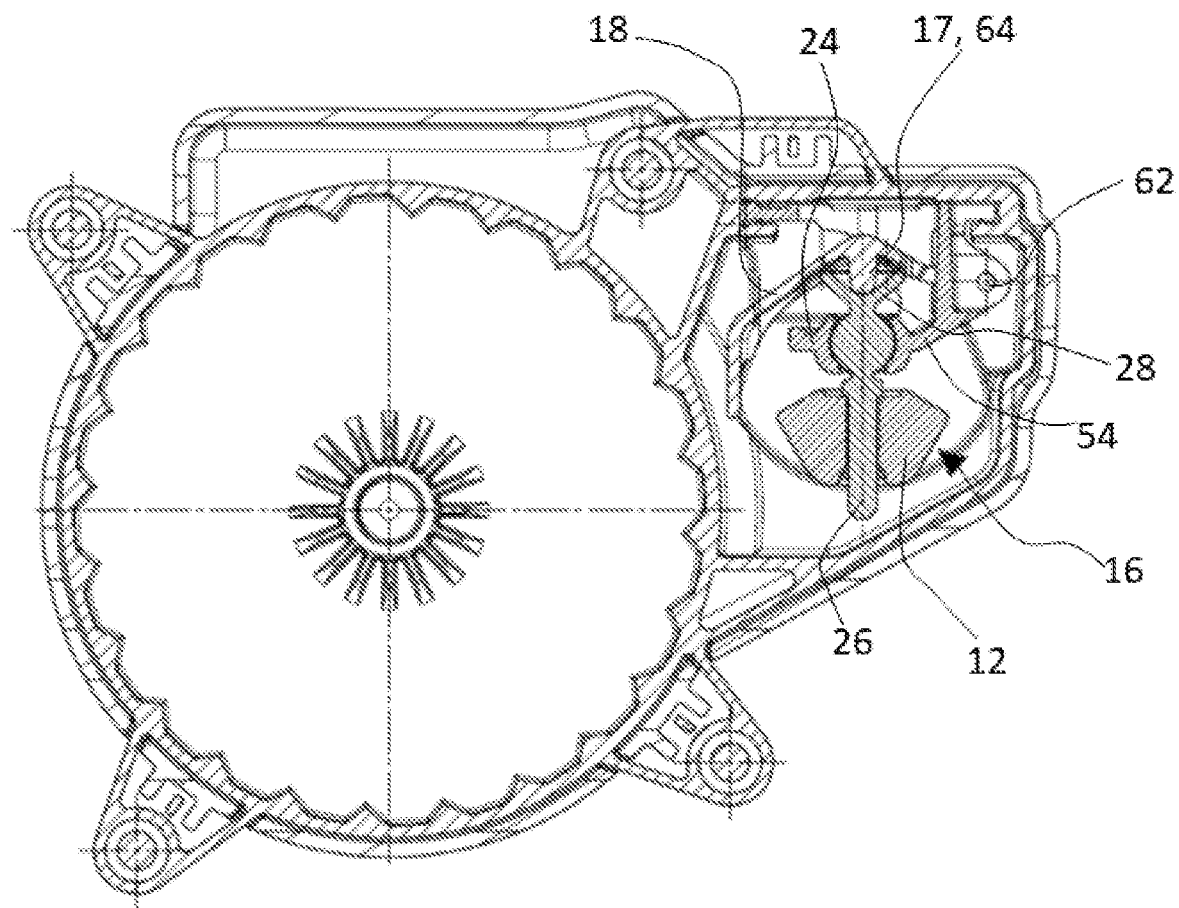
Figure 18:
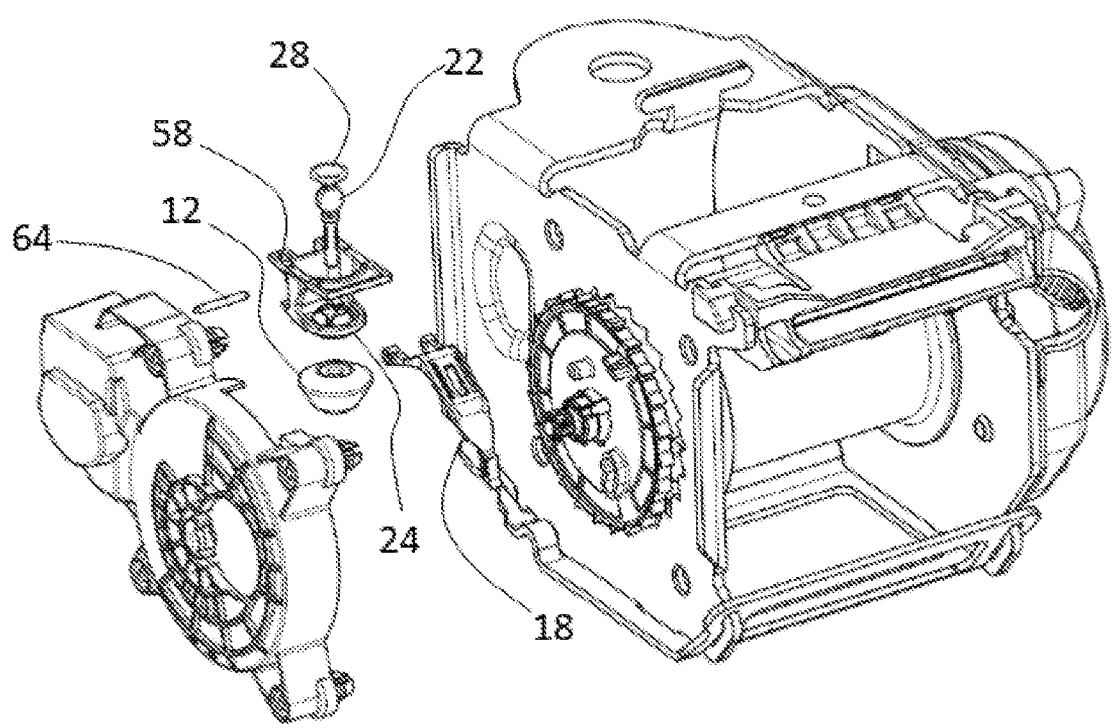
FIG. 18 shows an exploded view of the subassembly from FIGS. 16 and 17.

In the FIGS. 16 to 18, a belt tensioner subassembly 60 comprising a sensor 10 according to another embodiment according to the present disclosure is shown.

FIG. 17 illustrates a sectional view and FIG. 18 shows an exploded view of the belt tensioner subassembly 60. The mode of operation of the sensor in this embodiment corresponds to the mode of operation of the sensor 10 described in connection with the FIGS. 1 to 6. More exactly speaking, a sensor lever 18 is deflected by swiveling the inertia body 12. In contrast to the afore-described embodiment according to the FIGS. 1 to 6, the weight of the inertia body 12 and the force required for deflecting the sensor lever 18 are adapted to each other such that an additional damping medium can be dispensed with. Accordingly, the inertia body 12 is supported by the bearing shell 24. Said bearing shell is fastened to a housing of the belt reel by means of a retaining structure 58, for example.

The retaining structure 58 may simultaneously serve for supporting the sensor lever 18 which can be pivoted to the retaining structure 58 by means of a pivot pin 62, as is evident from FIG. 18. The mass ratio of the lever mass to the mass of the inertia body 12 can be achieved, as already described in connection with FIGS. 11 and 12, by a suitable material selection and size of the respective elements.

Another difference consists in the fact that the blocking pawl 42 is formed directly integrally with the sensor lever 18 and can be made to engage in locking teeth by deflecting the sensor lever 18. Moreover, it is evident from FIG. 17 that the sensor lever 18 rests on the plate-shaped element 28 via an integrally formed journal 64. The journal 64 especially forms the release element 17.

The invention claimed is:

1. A sensor for activating a vehicle-sensitive locking mechanism of a belt retractor, comprising an inertia body, a bearing supporting the inertia body, a release element which can be moved out of an idle position by movement of the inertia body so as to activate the vehicle occupant restraint system, wherein the inertia body can be pivoted about exactly one stationary point of rotation, and wherein the release element comprises a ball which is supported to be axially movable in a sleeve.

2. The sensor according to claim 1 wherein the bearing includes a ball to which the inertia body is fastened.

3. The sensor according to claim 2 wherein the inertia body is fastened to the ball of the bearing via a pin.

4. The sensor according to claim 2 wherein a disk-shaped element which in its center is tightly connected to the ball of the bearing is arranged in a point on the ball surface opposed to the suspension point of the inertia body.

5. The sensor according to any claim 2 wherein the inertia body is suspended in a bearing shell which encompasses the ball of the bearing along its equator.

6. The sensor according to claim 2 wherein the inertia body includes a conical portion, the inertia body being supported on the vertex of the cone.

7. The sensor according to claim 2 wherein a damping element is provided for dampening a movement of the ball of the bearing.

8. The sensor according to claim 1 wherein the inertia body is composed of two cones which contact each other at their respective base areas, wherein either of the cones has a convex surface area.

9. The sensor according to claim 1 wherein the release element is formed to engage a blocking pawl in locking teeth of a blocking mechanism.

10. A sensor for activating a vehicle-sensitive locking mechanism of a belt retractor, comprising an inertia body, a bearing supporting the inertia body, a release element which can be moved out of an idle position by movement of the inertia body so as to activate the vehicle occupant restraint system, wherein the inertia body can be pivoted about exactly one stationary point of rotation, wherein the bearing includes a ball to which the inertia body is fastened, and wherein a damping element is provided for dampening a movement of the ball of the bearing.

11. The sensor according to claim 10 wherein the inertia body is fastened to the ball of the bearing via a pin.

12. The sensor according to claim 10 wherein a disk-shaped element which in its center is tightly connected to the ball of the bearing is arranged in a point on the ball surface opposed to the suspension point of the inertia body.

13. The sensor according to claim 12 wherein the release element is a sensor lever including a plate-shaped element which in an idle state rests on the disk-shaped element.

14. The sensor according to claim 13 wherein the inertia body is accommodated in a housing, the sensor lever being pivoted to the housing.

15. The sensor according to claim 10 wherein the release element comprises a ball which is supported to be axially movable in a sleeve.

16. The sensor according to any claim 10 wherein the inertia body is suspended in a bearing shell which encompasses the ball of the bearing along its equator.

17. The sensor according to claim 10 wherein the inertia body includes a conical portion, the inertia body being supported on the vertex of the cone.

18. The sensor according to claim 10 wherein the inertia body is composed of two cones which contact each other at their respective base areas, wherein either of the cones has a convex surface area.

19. The sensor according to claim 10 wherein the release element is formed to engage a blocking pawl in locking teeth of a blocking mechanism.

\* \* \* \* \*